Oct. 4, 1960 S. D. POOL ET AL 2,954,657
CORN PICKER AND SHELLER
Filed April 23, 1958 6 Sheets-Sheet 1

Inventors.
Stuart D. Pool
Charles Verne Everett
Edward Svereika
Paul O. Pippel
Atty.

INVENTORS.
Stuart D. Pool
Charles Verne Everett
Edward Svereika

INVENTORS.
Stuart D. Pool
Charles Verne Everett
Edward Svereika

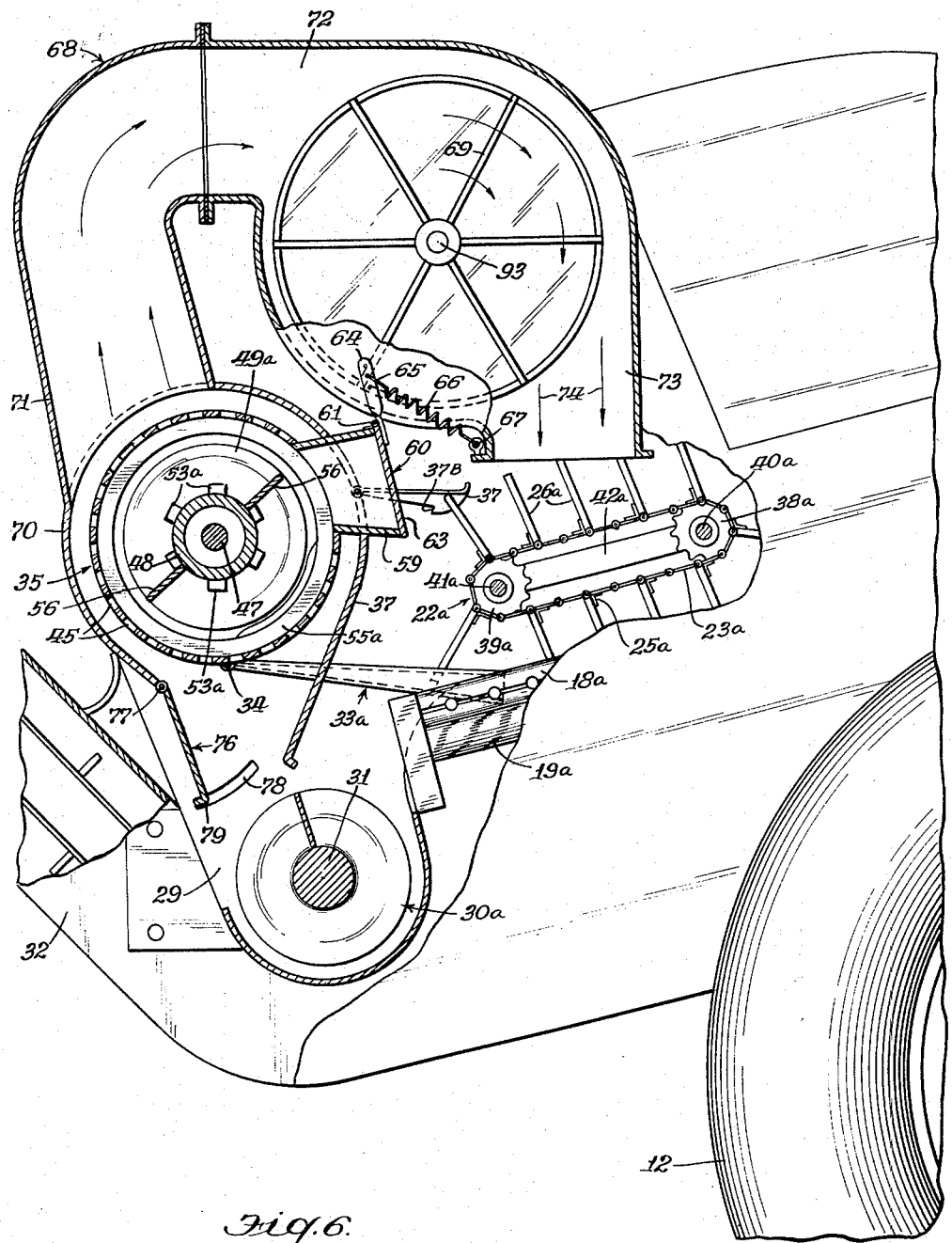

United States Patent Office 2,954,657
Patented Oct. 4, 1960

2,954,657
CORN PICKER AND SHELLER

Stuart D. Pool, Naperville, Charles Verne Everett, Warrenville, and Edward Svereika, Chicago, Ill., assignors to International Harvester Company, Chicago, Ill., a corporation of New Jersey Filed Apr. 23, 1958, Ser. No. 730,459
16 Claims. (Cl. 56—18)

This invention relates to a new and improved corn picker and sheller.

The corn picker and sheller of this invention is similar to and an improvement over the combination corn picker and sheller disclosed in the patent to Gerber, 2,443,031.

Farm practices are constantly changing. The harvesting of crops is not excluded from this changing process but rather is one phase which is receiving particular overhauling. The fact that crops may be dried by recently developed drying machines makes corn harvesting and immediate shelling thereof practical whereas heretofore it was deemed necessary to permit the kernels of corn to dry when still on the ear. Also the improvement in shellers in effectively removing kernels of corn from the ears regardless of the moisture content has made a field traversing corn picker and sheller within the realm of practicability. Corn pickers are now commonly in the category of pickers and huskers so that in the ordinary corn picker sold today clean ears are discharged from the machine. In this regard it should be understood that a sheller in combination with such a machine is even more feasible by reason of its having to do a lesser amount of work. In other words when the corn is delivered to the sheller it does not first have to remove the husks inasmuch as they have already been removed by the corn picking mechanisms.

A principal object of this invention is to provide a combination corn picker and sheller wherein corn is picked, husked and shelled.

Another important object of this invention is the provision of a combination of a corn shelling means attached to a corn harvesting machine wherein the corn is harvested while standing in a field and subsequently husked and then shelled.

Still another important object of this invention is to supply a corn sheller for attachment to corn pickers having husking means and the sheller arranged to receive corn directly from the husking means for subsequent shelling.

Another and still further important object of this invention is to equip a transversely disposed corn sheller onto the rear of a corn picker and husker and arranged to deliver husked ears to the underside of the corn sheller.

A still further important object of this invention is to provide a corn harvesting machine with means for optionally delivering snapped and husked ears or shelled corn as desired.

Another important object of this invention is the provision of a corn sheller having a transversely disposed shelling rotor with auger feed means at both ends thereof whereupon husked corn fed to the ends of the corn sheller is fed laterally inwardly for shelling by a common shelling rotor.

A still further important object of this invention is to provide a corn sheller with a shelling chamber, a shelling rotor therein, auger conveyor means on said rotor to feed ears of corn fed thereto axially of the rotor and including annular dam means within the shelling chamber to retard free movement of ears of corn to be shelled through the corn sheller.

A still further important object of this invention is to provide a corn sheller having means for feeding ears of corn in from both ends thereof and including a straight through shelling rotor with a cob discharge at a central portion thereof.

Another and still further important object of this invention is to equip a corn sheller with a suction means to remove trash therefrom and said suction means having a fan spaced from the path of trash travel.

Other and further important objects and advantages will become apparent from the disclosures in the following specification and accompanying drawings.

In the drawings:

Figure 6 is a sectional view taken on the line 6—6 of Figure 2.

Figure 1:
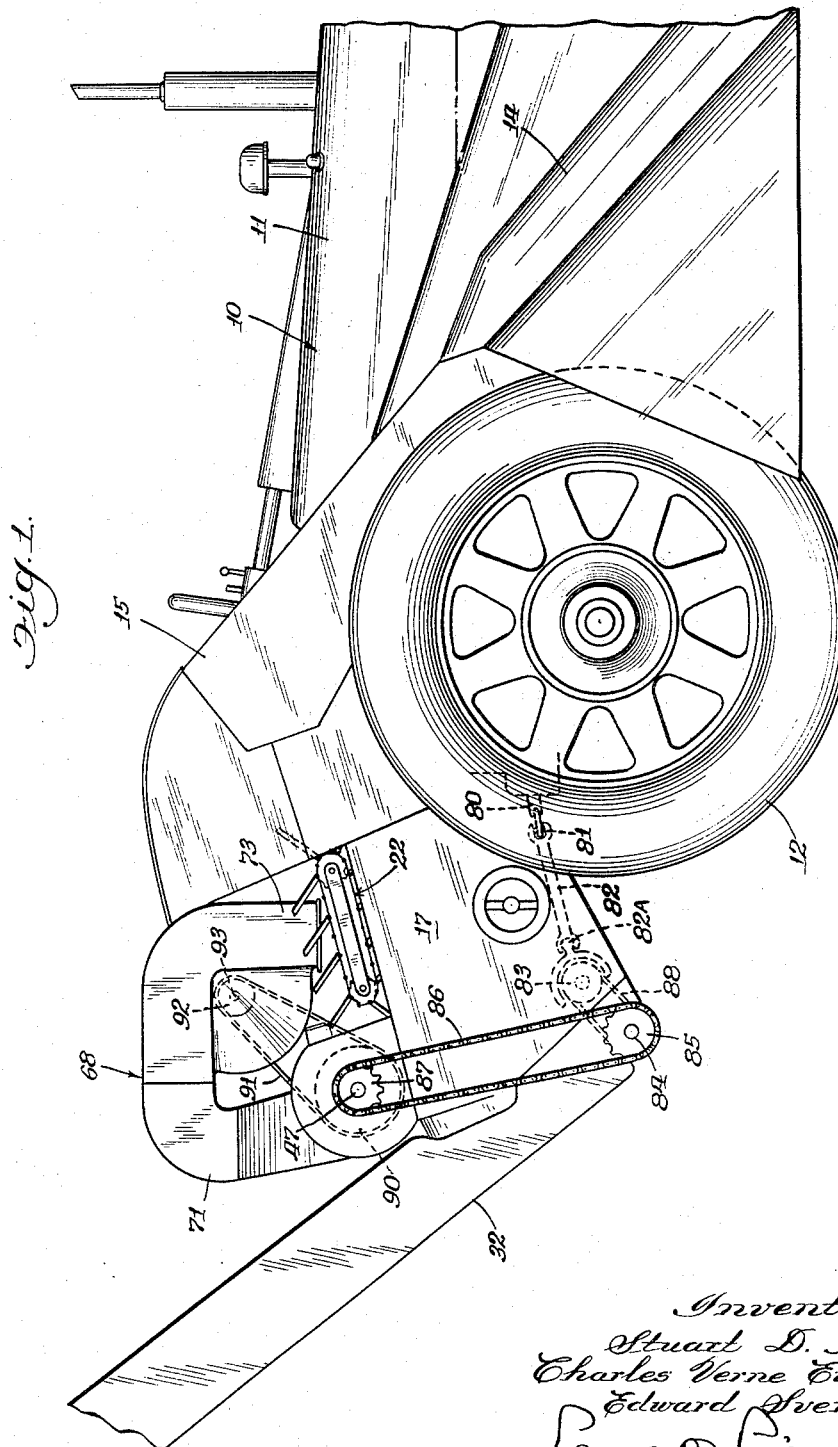
Figure 1 is a side elevational view of a part of a corn picker having the sheller of this invention incorporated therein.

As shown in the drawings the reference numeral 10 indicates generally an agricultural tractor having a generally narrow longitudinally extending engine and chassis 11 which is supported at its rearward end by relatively widely spaced apart large traction wheels 12 and 13. The tractor mounted corn picker on which the sheller of this invention is mounted is shown generally in the copending application Serial No. 687,236, now Patent No. 2,909,883. However, this is only one embodiment and it is obvious the sheller of this invention could be adapted for any corn picker and mounted thereon. Corn picking units 14 and 14a are positioned on each side of the tractor engine 11 and between the engine 11 and each of the widely spaced apart traction wheels 12 and 13 in a longitudinal direction. For convenience the reference numerals on the symmetrical portions of the two row corn picker-sheller of this invention will be provided with an "a" suffix. Thus the picker unit on one side of the tractor is identified at 14 whereas the same picker unit on the other side is identified as 14a. This practice shall be carried through the entire specification and drawings. The details of the picking unit have not been disclosed herein inasmuch as the machine of this invention may be operated with any type of picking means and it is generally understood that the unit shall include the usual gathering chains, snapping rolls and elevator mechanisms. After the corn has been picked and snapped from the stalks by the customary snapping rolls it is carried upwardly through housings 15 and 15a and thereupon carried downwardly and rearwardly for delivery over husking beds 16 and 16a disposed within individual housings 17 and 17a.

Figure 2:
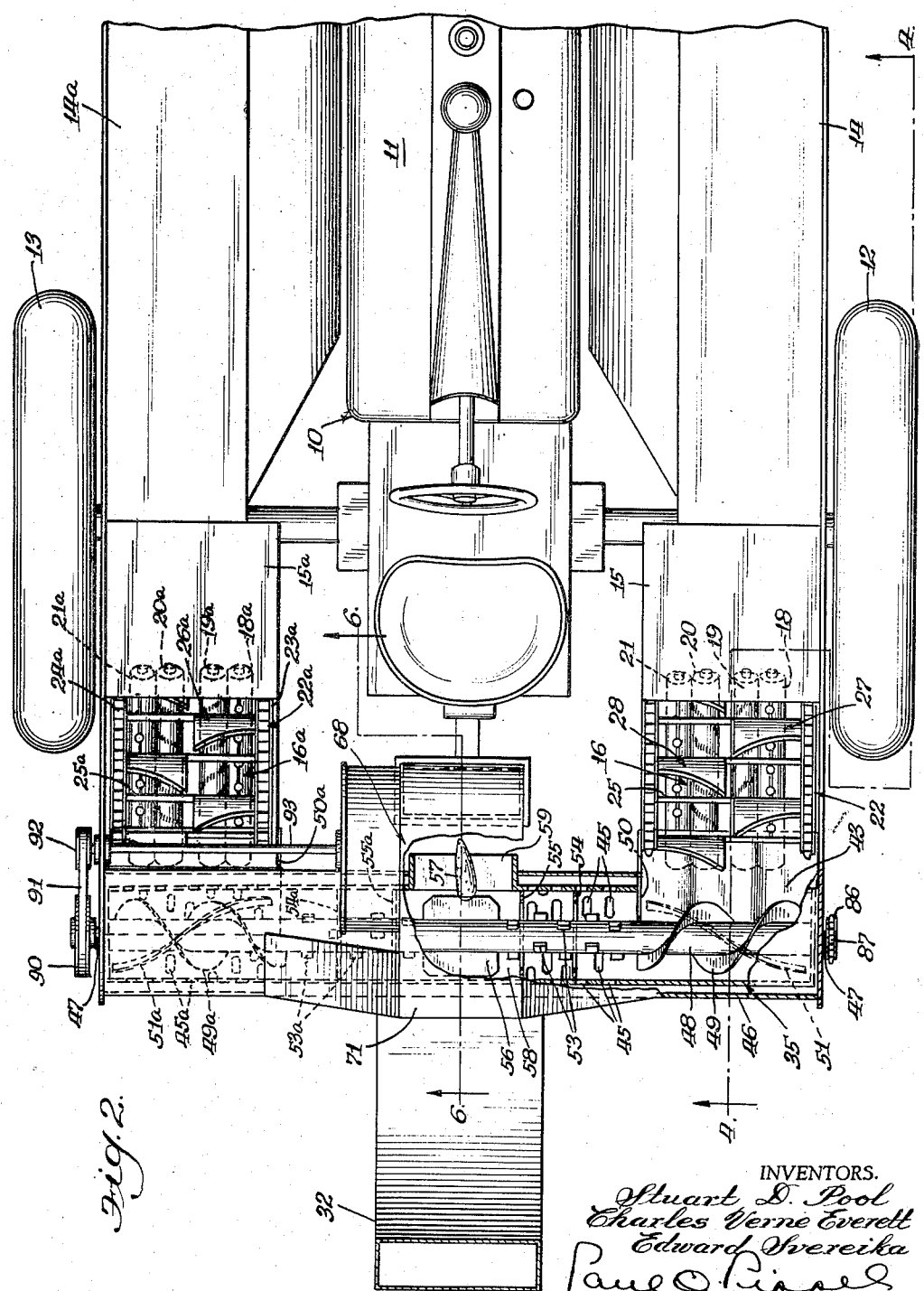
Figure 2 is a top plan view of the corn picker-sheller as shown in Figure 1.
Figure 4:
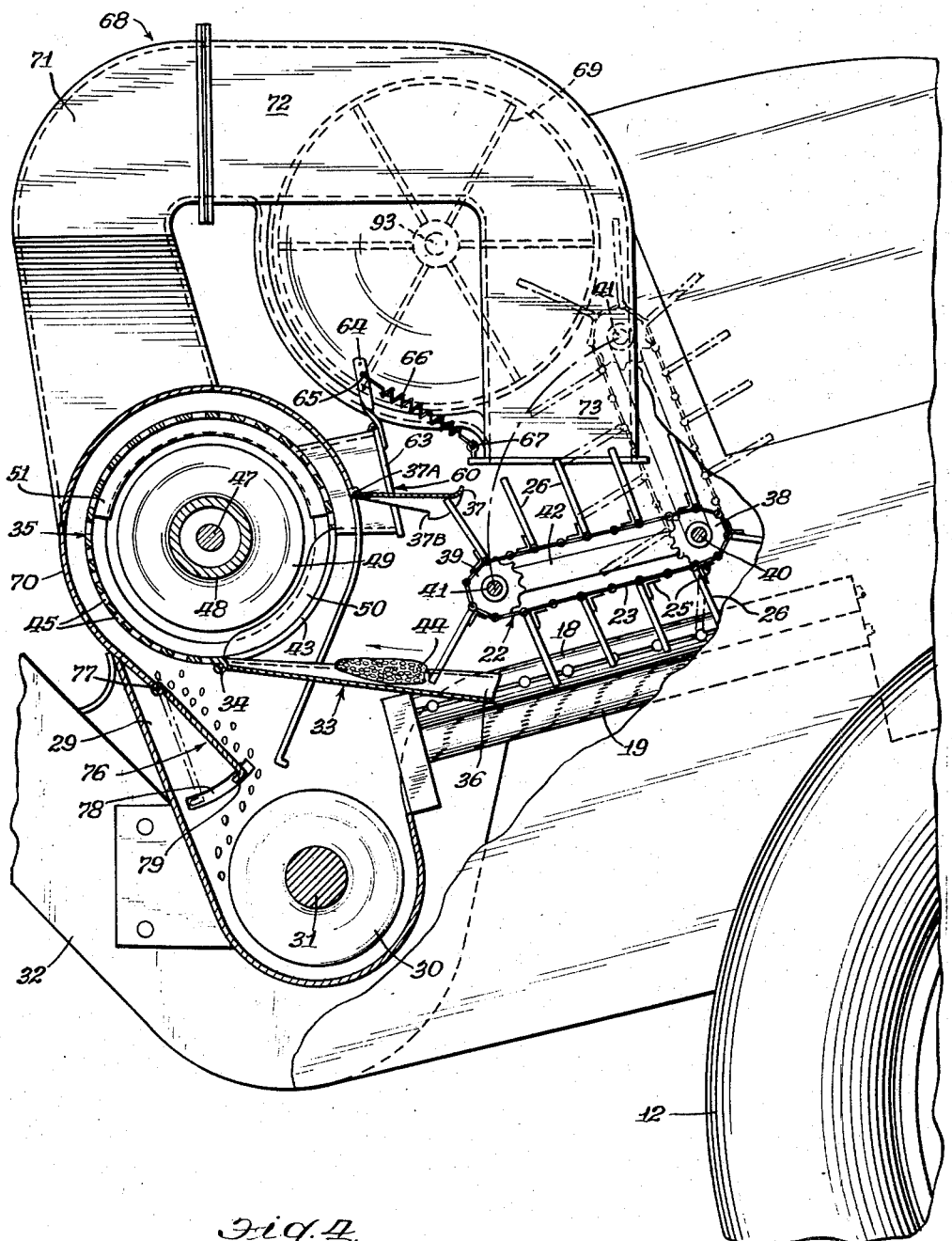
Figure 4 is a vertical sectional view taken on the line 4—4 of Figure 2.

The husking beds 16 and 16a comprise in this instance two pairs of cooperative husking rolls on each side of the tractor to receive snapped ears of corn from each of the picking units 14 and 14a respectively. The plan view of the portion of the tractor mounted corn picker and sheller of Figure 2 clearly shows the two pairs of cooperative husking rolls. The husking bed 16 has a first pair of inwardly turning cooperative rolls 18 and 19 and a second pair of cooperative inwardly turning rolls 20 and 21. The rolls thus present beds 16 and 16a over which the snapped ears of corn are fed longitudinally by means of ear forwarder belts designated generally as 22 and 22a. The plan view of the forwarder belts is shown in Figure 2 and a side elevational view is shown in Figure 4. The belt comprises spaced apart chains 23 and 24 and adjoining cross slats 25 having flexible paddles 26 thereon. The width of the slats 25 is sufficient to extend substantially across both pair of cooperative husking rolls. The flexible paddle-like members 26 are arranged in two side-by-side longitudinal paths 27 and 28. The path 27 of flexible paddle member 26 is arranged to move ears of corn along the cooperative rolls 18 and 19 and the parallel and spaced apart path 28 of flexible paddle members 26 is disposed along the juncture between the pair of cooperative husking rolls 20 and 21. It will thus be seen that ears of corn are adapted to be moved along both husking roll junctures to thereby cause the ears of corn to be readily husked and thereby stripped of this natural enclosure for the ears of corn.

It is an object of this invention to utilize the snapped and husked ears of corn for subsequent shelling on this same machine. Further it is an object of this invention to provide a mechanism for either completely shelling the corn from the ear or delivering merely snapped and husked ears of corn as they are conditioned following their travel over the husking beds 16 and 16a. Without the corn sheller attachment the snapped and husked ears of corn are permitted to drop into a hopper 29 disposed at the rear of the husking bed 16. Within the hopper there is disposed an auger type conveyor 30 mounted on a shaft 31. The auger conveyor 30 is composed of oppositely disposed screw portions 30a and 30b on the shaft 31 and are arranged to deliver material centrally thereof. The ears of corn are thus fed laterally toward the center of the machine whereupon an upwardly and rearwardly inclined wagon elevator 32 engages the ears of corn and delivers them to a trailing wagon or the like (not shown).

Figure 3:
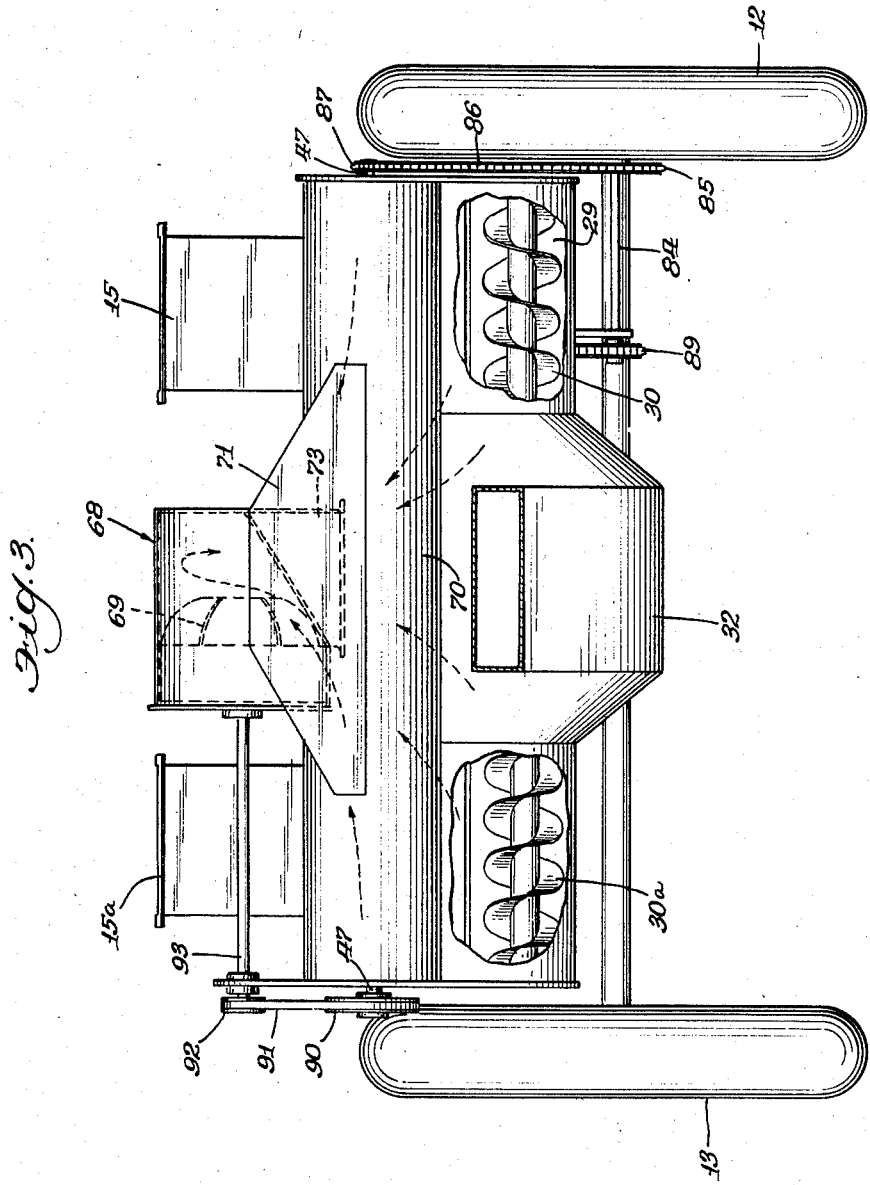
Figure 3 is a rear elevational view of the corn picker-sheller as shown in Figure 1 with portions thereof broken away to show interior construction.
Figure 5:
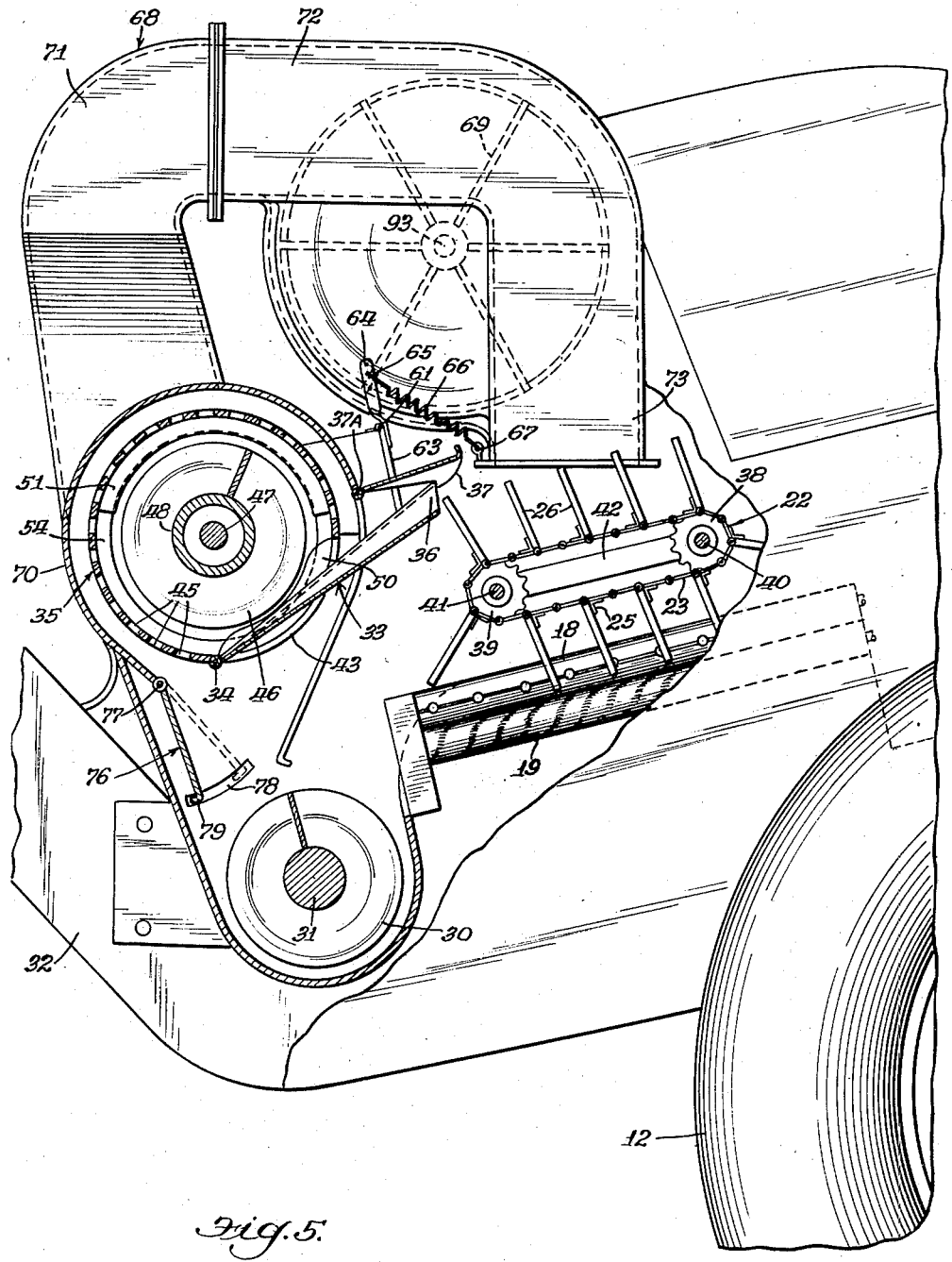
Figure 5 is a sectional view similar to Figure 4 with the parts thereof arranged so that the corn picker may function without benefit of the sheller.

As shown in the top plan view of Figure 2 it is apparent the shelling unit is adapted to have a forwardly extending portion on each side thereof to cooperate with the husking beds 16 and 16a on each side of the picker and thereupon transmit snapped and husked ears of corn from the husking bed to the shelling device. The corn sheller is generally disposed transversely across the rear of the corn picker and substantially over the hopper 29. Figure 3 shows an ear chute 33 hinged at 34 to the underside of a shelling chamber 35. The shelling chamber 35 is substantially cylindrical in shape and as previously stated extends across the rear of the tractor and above the corn receiving hopper 29. The ear chute 33 as shown in Figure 4 is swung downwardly so that its forward end 36 lies directly over the husking bed 16 to thereupon cause the ears on the bed to be directed up the very slight incline of the chute 33 and into the shelling chamber 35. The ear forwarder conveyors 22 and 22a with their long flexible paddle members 26 and 26a aid in forcing the ears of corn up the slight incline of the ear chutes 33 and 33a and thence into the shelling chamber 35. In the alternative position of the ear chute as shown in Figure 5 the chute 33 is swung upwardly about its hinge 34 and held by means of a latching member 37 which is hinged at 37a to the shelling chamber 35. A detent 37b is provided on the latch 37 to permit locking of the end 36 of the chute 33. Thus in the device as shown in Figure 5 the shelling apparatus is excluded from the equipment and the corn picker operates in its ordinary fashion to snap and husk ears and deliver the husked ears to a trailing wagon or the like. When, however, the chute 33 is lowered by reason of a releasing of the latch 37 and thereupon dropped to the husking bed 16 it receives all of the husked ears of corn and delivers them into the shelling apparatus. Thus in this manner the regular gathering and elevating apparatus is temporarily bypassed to route the corn through the shelling mechanism.

As previously stated the ear forwarder for moving the ears of corn over the husking bed 16 comprises spaced apart chains 23 and 24 and intermediate slats and flexible members. In the side elevational views of the ear forwarder mechanism and particularly in Figure 4 thereof the chains are shown as mounted on sprockets 38 and 39. Cross shafts 40 and 41 join the spaced sprockets 38 and 39 respectively and thus provide for the carrying of the spaced apart and aligned chains 23 and 24. Arm members 42 are shown connecting the shafts 40 and 41 on each side of the ear forwarder belt 22 causing the chain to remain extended and to function in the desired manner to cause moving of ears over the husking bed and then up the slightly inclined chute 33 for delivering the snapped and husked ears to the shelling mechanism. The shaft 40 constitutes a hinge about which the ear forwarder belt 22 may be conveniently swung as shown in Figure 4 to permit the raising of the chute 33 from the position as shown in Figure 4 to the position as shown in Figure 5. The dash line position of the ear forwarder belt 22 in Figure 4 indicates the position of the ear forwarder belt during actual movement of the chute from its lowered position to its upper position or vice versa and thence after the change of the chute is effected the ear forwarder belt may be lowered to its operating position. It will be understood that in both positions of the chute 33 the ear forwarder belt acts to forward ears of corn over the husking bed 16. When the chute is down and directing ears of corn to the shelling mechanism the ear forwarder belt also functions to move ears of corn up the chute 33 into the shelling mechanism. The hinging of the ear forwarder belts 22 and 22a also provide means for effectively handling various quantities of ears of corn.

In the device as shown in Figures 2 and 4 the ears of corn are delivered up the chute 33 and through an opening 43 in the sheller chamber housing 35. The location of the arcuate opening 43 is substantially at the bottom or underside of the cylindrical housing 35 so that the ears of corn shown at 44 are fed generally into the bottom of the housing 35. The internal walls of the cylindrical housing 35 act as the concave for the shelling mechanism. As particularly shown in Figure 2 the inner wall of the tubular housing 35 is provided with a plurality of spaced apart rectangularly shaped openings 45 so that ears of corn passing therethrough will be scraped and retarded sufficiently to cause a shelling of the kernels from the ears of corn. The ears are fed into the concave by reason of an auger conveyor 46 which is mounted on a shaft 47. The shaft 47 extends transversely across the rear of the tractor mounted corn picker. The auger conveyor 46 is provided with a drum or core member 48 and spiral flight portions 49 and 49a thereon. The ears of corn 44 are fed to the underside of the auger conveyor 46 whereupon the spiral flights 49 and 49a cause the ears to move laterally in the perforated tubular concave 35. Stationary formed walls 50 and 50a are provided adjacent the inner sides of the chutes 33 and 33a and limit movement of ears 44 into the tubular housing 35 except by movement under the core 48 of the auger 46. The ears are thus moved laterally into the chamber 35 by means of the screw flights 49 and 49a. As shown in Figure 2 spiral members in the form of angles 51 and 51a are mounted fixedly on the internal walls of the cylindrical housing. These spiral angles cooperate with the rotatable spiral flights 49 and 49a on the auger 46 to insure the passage of ears laterally of the auger 46 rather than around the auger and thus into the apertured shelling housing. Between the auger flights 49 and 49a the core 48 carries a shelling rotor 52 at a position laterally inwardly of the walls 50 and 50a. The rotor 52 is provided with outwardly projecting lugs 53 to cooperate with the concave openings 45 and thereupon shell kernels of corn from the ears as they pass therethrough.

The principle of shelling kernels of corn from the ears is based on a relatively full chamber of a plurality of ears of corn, each one of which is rubbed against the other and the lugs 53 on the rotor and the holes 45 in the concave cause agitation amongst the ears and eventually a rubbing off of the kernels from the ears. In other words the lugs act as agitating means for the corn as the ears move through the shelling chamber 35. If the ears were to move through the shelling chamber too fast many of them would pass without being shelled. Thus it is essential to retard movement of the ears to give the ears a chance to have the kernels of corn stripped therefrom. In this regard there is provided within the tubular housing 35 annular rings or dams 54 and 55 spaced along the shelling chamber as shown in Figure 2. The first ring 54 retards the flow of ears through the shelling chamber and thus makes for more efficient shelling. Similarly the retarder ring 55 acts in the same manner as the ring 54 and keeps the ears of corn in that strata defined as between the rings 54 and 55 giving the shelling chamber a further opportunity to finally strip all of the kernels from the ears of corn. The retarder rings or dams 54 and 55 thus perform the function of gaining more efficient shelling from the shelling device by keeping the ears in the first section of the shelling chamber between the wall 50 and the retarder ring 54 and then keeping them at least for a time within the chamber defined as between the rings 54 and 55. Thereafter the stripped cobs 57 are fed into a chamber 56 and thus out forwardly as shown in Figure 2. The kernels of corn shelled from the ears drop downwardly through the apertures 45 in the concave defined as the tubular shelling chamber 35.

It should thus be apparent that in the shelling operation we have merely to dispose of two items, that is, the shelled corn and the stripped cobs. The cobs are as previously stated moved centrally of the machine into the chamber 56 inwardly of the last retarder rings 55 and 55a. At this position the cobs 57 are paddled or forced forwardly by means of paddle members 58 and thence out the discharge spout 59. As best shown in Figure 6 a gate 60 is hinged at 61 to the discharge spout 59. The gate has its principal portion 63 projecting down over the opening of the discharge spout 59. An upward extension 64 is provided to receive one end 65 of a spring 66. The other end of the spring 66 is anchored as shown at 67 to a portion of a housing 68 which will be subsequently described. The housing functions also to shield and enclose the suction cleaning fan 69. The spring 66 is thus arranged and constructed to normally urge the gate 60 into closed position over the discharge chute or spout 59. Thus the cobs within the shelling chamber are restricted in their free passage outwardly by the gate 60 and must push the gate portion 63 outwardly against the action of the spring 66 whereupon they are free to fall forwardly and thence to the ground. The spring biased or yieldable gate insures that the cobs remain in the shelling chamber until such time as they are completely shelled and there is no free and easy passage of the ears of corn through the shelling chamber until all the corn is shelled therefrom. It is this back pressure built up on the cobs by the several described elements which makes for an efficient shelling mechanism.

As previously stated a housing 68 is provided for the fan 69. As best shown in Figures 2, 5 and 6 the housing 68 includes a shell or housing portion 70 disposed around the shelling chamber 35 and a tubular portion projecting upwardly at a generally central location at 71. A forwardly disposed tubular portion 72 houses the suction fan 69. The surrounding sleevelike structure 70 covering the shelling chamber 35 provides the passage means for removing dust and other light foreign material that may become associated with the shelled kernels of corn. Thus as the corn drops through the concave 35 through the openings 45 it is subjected to a suction created by the fan 69. The fan originates a current sufficiently strong to remove dust and other foreign particles from the corn but is not strong enough to carry the kernels of corn up the vertical passage 71. Hence there is a separation between the light trash material and the corn immediately after the corn is shelled from the cobs. The light trash material is carried up the passage 71 above the shelling chamber 35 after which it is passed horizontally through the portion 72 of the passage for discharge downwardly through the spout 73 as indicated by the arrow 74 as shown in Figure 6. The fan 69 is laterally offset from the passage 72 as shown in Figures 2 and 3 so that the trash material does not actually pass through the fan. This avoids choking of the fan when husks from imperfectly husked ears as passed therethrough.

The portion of the shelling mechanism located beneath the shelling chamber 35 and forming a downward extension of the housing 68 is equipped with an adjustable corn delivering gate 76 which is hinged at 77 to the lower extension of the housing 68. The gate 76 as shown in Figures 4 and 6 may be angularly adjusted to vary the amount of opening beneath the shelling concave 35 and thereupon increase or decrease the amount of suction created by the fan 69. This of course varies the effective lifting power of fan 69 and a clean separation of light trash material from the kernels of corn may be effected by proper adjustment. An elongated slot 78 is provided in the housing 29 defining the hopper and it is within this elongated arcuate slot 78 that the outer end 79 of the hinged gate may be adjusted. In Figure 4 the gate is shown swung upwardly for its minimum opening position and in Figures 5 and 6 the grain pan is swung back for maximum opening position of the device. The gate should preferably be in the position as shown in Figure 4 when the sheller of this invention is inoperative by reason of the chutes 33 and 33a being locked in their upper position.

In Figure 1 there is shown a tractor power take-off shaft 80 to which there is attached a universal joint or knuckle 81, a drive shaft 82, a second knuckle 82a, and a right angle gear case 83 which delivers drive to a jackshaft 84. The jackshaft 84 as shown in Figure 3 extends across the rear of the tractor-mounted corn picker-sheller of this invention. A sprocket 85 is mounted on the jackshaft 84 and by means of a chain 86 drive is carried upwardly and slightly rearwardly to a sprocket 87 mounted on the shelling rotor and auger shaft 47. The drive from the right angle gear case 83 to the jackshaft 84 is accomplished by a chain 88 delivering rotational drive to a sprocket 89 also mounted on and keyed to the jackshaft 84.

The shelling rotor shaft 47 is continuous throughout the width of the sheller and projects beyond the other side of the sheller where it has a V-pulley 90 mounted thereon. A V-belt 91 engages the V-pulley 90 and imparts rotational drive to a V-pulley 92 mounted on a shaft 93 which is disposed parallel to and spaced forwardly from the rotor shaft 47. The shaft 93 also carries the suction fan 69 so that drive to the shelling mechanisms is now completed.

In the operation of the corn picker-sheller of this invention it should be understood that the machine may operate merely as an ordinary corn picker wherein the corn is snapped from the stalks, thereafter husked, and finally delivered to a trailing wagon or the like. In the alternative the machine may function as a corn picker and sheller wherein the corn is taken after it has been snapped and husked and thereafter shelled. Obviously the position of the hinged chutes 33 and 33a on both sides of the tractor-mounted corn picker sheller provide the key as to whether there shall be a mere corn picker and husker or a corn picker-husker-sheller. When the chutes are in a down position and resting on and over the rearward ends of the husking beds 16 and 16a the corn ears after they have been husked are scooped upwardly and fed generally through openings in the housing 70 and shelling chamber 35 to the underside of the shelling rotor which has on its outer ends the spiral flights 49 and 49a causing the ears to be moved inwardly from each end of the shelling rotor. When the ears pass the walls 50 and 50a located adjacent both ends of the shelling chamber 35 they are disposed within the shelling mechanism whereupon the barbs or lugs on the rotor and the ears crowded therein cause the kernels of corn to be stripped from the ears. The shelled kernels then drop through the apertures 45 in the concave 35 and are received by the hopper 29 having the transversely feeding auger 30 for delivering the corn to the wagon elevator 32. The shelling chamber is open throughout its length so that the ears from both ends are fed toward a common center and the congestion created in the central portion of the shelling chamber assists in the efficient shelling of kernels of corn from the ears. There is no central divider between the two portions of the shelling chamber. Thus the corn from both rows can conceivably communicate with each other during shelling and the resistance established by the shelling rotor feeding centrally to the same chamber 56 eliminates the necessity for more aggressive shelling projections on the shelling rotor and cooperative concave. A single cob discharge 59 is provided at this central chamber. The shelling unit is different from shellers previously known and operates more effectively for several reasons. The entire apparatus has already been described in detail but attention is further called to the spiral angles which are positioned on the stationary concave to prevent wrapping of ears or continuous rotation of ears about the auger core 48 at the point of entrance into the shelling chamber 35. Further the retarding rings or dams 54 and 55 within the shelling chamber enables more complete use or function of the shelling chamber throughout its entire length rather than to shell merely at the point of discharge. The central meeting of the cobs from both ends of the straight through shelling rotor has already been discussed and it merely remains for the removal of the trash to be described. This light trash material is drawn upwardly and out by a suction created on and over the shelling chamber as the corn drops through the concave. The trash is moved upwardly and thence forwardly through the passages 71 and 72 and thence downwardly through the discharge spout 73. The offsetting of the fan 69 from the actual path of travel eliminates maintenance which might be caused by movement of trash through a pulling fan.

When the chutes 33 and 33a are latched in an up position the sheller is bypassed. At this time it might be desirable to disengage the drive from the sheller and this is accomplished by a removal of the chain 86.

We are aware that numerous details of construction may be varied throughout a wide range without departing from the principles disclosed herein and we, therefore, do not propose limiting the patent granted hereon otherwise than as necessitated by the appended claims.

We claim:

1. In a corn sheller for use in cooperation with a corn picker which discharges harvested ears of corn, a chute to receive ears of corn from said picker, a shelling device including a shelling rotor and a concave therefor, and said chute fastened to the underside of said shelling device and adapted to deliver corn to the underside of said shelling device.

2. A corn sheller for attachment to a field traversing picker comprising a corn sheller unit disposed transversely of the line of travel of said picker across the rear and at a position rearwardly of and substantially above the field traversing picker, a corn receiving hopper mounted on said picker beneath said corn sheller unit, and means for optionally directing picked ears of corn to said corn sheller unit or to said receiving hopper.

3. A corn sheller for mounting on the rear of a corn picker which delivers harvested ears of corn thereto comprising a corn sheller unit disposed transversely on said corn picker across the rear thereof and at a position rearwardly and substantially above the delivery position of said corn picker, a corn receiving hopper mounted on said corn picker adjacent to said delivery position for ears of corn, said corn receiving hopper located beneath said shelling unit, and removable chute means located over said corn receiving hopper for delivering in one position thereof ears of corn to the underside of said shelling unit and in its removed position permitting delivery of ears of corn to said corn receiving hopper.

4. A device as set forth in claim 3 in which said removable chute means is hingedly mounted on said corn sheller unit.

5. A device as set forth in claim 3 in which said corn shelling unit includes a transversely disposed sheller rotor, a tubular concave housing around said shelling rotor, and spiral screw flight means on said shelling rotor in the path of said point of receiving of ears from said corn picker.

6. A device as set forth in claim 3 in which said corn shelling unit includes a transversely disposed sheller rotor positioned across the rear of the field traversing corn picker-sheller, a tubular concave surrounding said shelling rotor, a housing for said corn sheller unit, said housing and tubular concave having openings at each end to receive ears of corn to be shelled, a cob discharge adjacent a central portion of said tubular concave, and said tubular concave providing a continuous chamber from one housing opening at one end to the other housing opening at the other end.

7. A corn sheller comprising a housing, a shelling rotor journally mounted in a generally horizontal position in said housing, a sleeve concave mounted in said housing in a generally horizontal position and around said shelling rotor, said shelling rotor having screw flight on one end thereof and arranged to feed ears of corn lengthwise of said shelling rotor, said sleeve concave having an ear corn feed opening in the underside thereof, and means feeding ears of corn to be shelled to said ear corn feed opening.

8. A device as set forth in claim 7 in which there is included stationary flight members affixed to the interior of said sleeve concave adjacent the opening therein and cooperating with the screw flight on the shelling rotor to cause effective feeding of the ears of corn lengthwise of the rotor.

9. A device as set forth in claim 7 in which there is included annular rings mounted on and internally of said sleeve concave to retard the movement of ears of corn through said sheller.

10. A corn sheller comprising a housing, a shelling rotor journally mounted in a generally horizontal position in said housing, a sleeve concave mounted in said housing in a generally horizontal position and around said shelling rotor, said shelling rotor having oppositely pitched screw flight on each end thereof and arranged to feed ears of corn lengthwise of said shelling rotor and toward the center thereof, ear corn inlet means in said housing and sleeve concave adjacent the ends of said shelling rotor and said housing and sleeve concave having a cob discharge opening adjacent the center of said shelling rotor.

11. A device as set forth in claim 10 in which the sleeve concave is continuous from one end of the shelling rotor to the other and the central portion thereof adjacent the cob discharge opening comprises a common chamber for cobs coming from both ends of said shelling rotor.

12. A device as set forth in claim 11 in which the ear corn inlet means in said housing and sleeve chamber adjacent the ends of the shelling rotor are located on the underside of said shelling rotor.

13. A device as set forth in claim 10 in which said sleeve concave is apertured to permit the outward passing of kernels of corn as they are shelled from the ears of corn fed therethrough, and means delivering the shelled corn from said housing and means collecting said shelled kernels of corn.

14. A device as set forth in claim 13 in which there is included a fan mounted in said housing, said housing including passage means communicating with said sleeve concave and said fan, and said fan providing suction for the removal of light trash material from the shelled kernels of corn prior to collection of the corn.

15. A device as set forth in claim 14 in which adjustable gate means is positioned in said housing adjacent the underside of said apertured sleeve concave whereby the amount of suction may be varied.

16. A device as set forth in claim 10 in which there is included a spring biased gate for said cob discharge opening to retard movement of cobs therethrough.

References Cited in the file of this patent
UNITED STATES PATENTS

| | | |
|---|---|---|
| 259,157 | Horton | June 6, 1882 |
| 2,443,031 | Gerber | June 8, 1949 |
| 2,841,944 | Carlson et al. | July 8, 1958 |